United States Patent [19]

Cella

[11] 4,042,759
[45] Aug. 16, 1977

[54] BATTERY QUICK DISCONNECT SYSTEM
[76] Inventor: Alexander Cella, Robinwood Drive, Great Notch, N.J. 07013
[21] Appl. No.: 607,098
[22] Filed: Aug. 25, 1975
[51] Int. Cl.$^2$ .............................................. H01M 2/30
[52] U.S. Cl. .................................... 429/121; 429/178; 339/263 B
[58] Field of Search ................ 136/135 R, 135 S, 181; 339/224, 228, 231, 232, 236, 238, 46, 263 B; 429/121, 178

[56] References Cited
U.S. PATENT DOCUMENTS

| | | | |
|---|---|---|---|
| 1,633,176 | 6/1927 | Goeller | 136/135 S |
| 2,128,888 | 8/1938 | Pierpoint | 339/228 |
| 2,441,481 | 5/1948 | Garrity | 339/263 B |

FOREIGN PATENT DOCUMENTS

| | | | |
|---|---|---|---|
| 1,055,063 | 2/1954 | France | 136/135 R |
| 471,168 | 11/1935 | United Kingdom | 136/135 R |

Primary Examiner—Donald L. Walton
Attorney, Agent, or Firm—Hubbell, Cohen, Stiefel & Gross

[57] ABSTRACT

A quick disconnect system for removably connecting a electrical cable to a battery terminal post comprises either a pin therethrough which is engaged by an angulated slot in a spring loaded connector which slot includes a notch for locking the connector onto the pin, the connector being quickly disengageable from the terminal post by exerting a force opposite to the spring biasing force while sliding the connector off the pin; or a threaded type in which a threaded sleeve is secured to an existing battery terminal post which interfaces with a threaded connector for locking thereon by 90 degree rotation and unlocking by 90 degree rotation in the opposite direction; or a quick disconnect comprising a snap ring secured to a groove of an existing terminal post wherein a grooved resilient cover is snap-fit onto the split type snap ring secured to the existing terminal post. Each of the arrangements provides an electrical connection between the battery cable and the terminal post with the spring providing the electrical interconnection in the first instance, either conductive threads or the protrusion of the existing terminal post through the sleeve providing the electrical interconnection in the second instance, and with a conductive inner lining for the snap fittable cover providing the electrical interconnection between the battery cable and the terminal post, in the third instance. Each of the above arrangements may readily convert an existing battery terminal post into a system in which the battery cable may be quickly connected to and disconnected from the terminal post.

7 Claims, 9 Drawing Figures

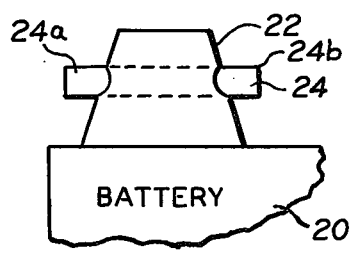
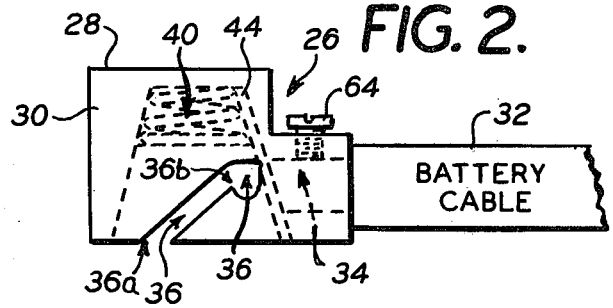
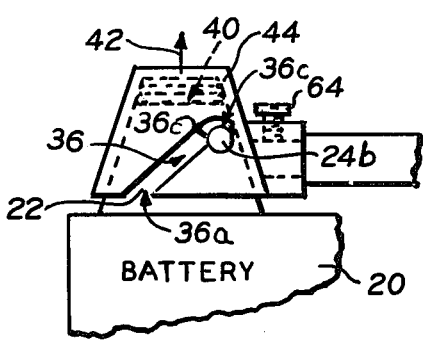
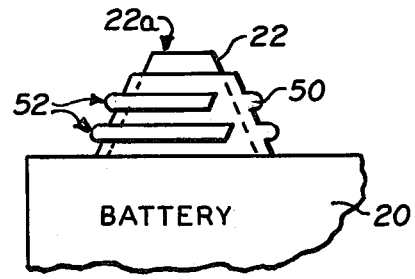
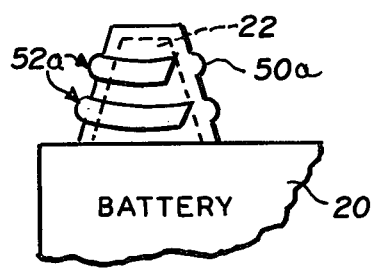
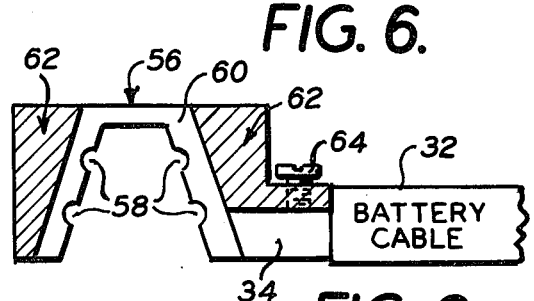
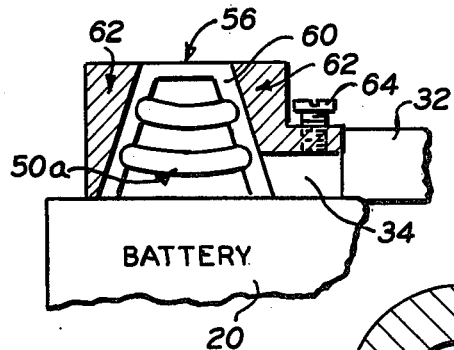
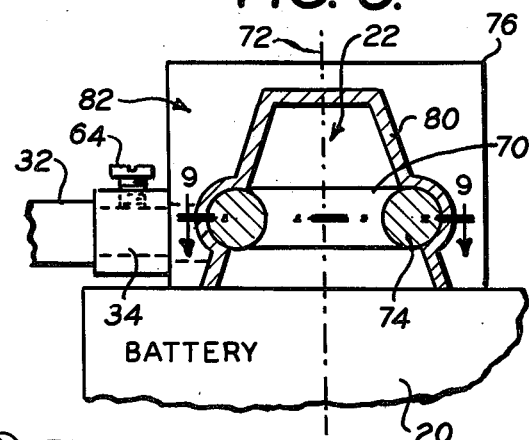
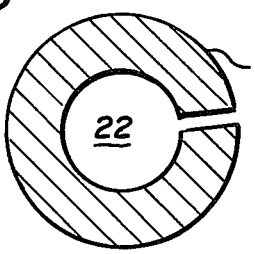

BATTERY QUICK DISCONNECT SYSTEM

BACKGROUND OF THE INVENTION

1. Field of the Invention

The present invention relates to quick disconnect systems for removably connecting an electrical cable to a battery terminal post.

2. Description of the Prior Art

Battery disconnect systems for facilitating the connection and disconnection of battery cables to battery terminals, such as in the instance of what is commonly termed automobile storage batteries or other types of storage batteries, are well known. Examples of such spring type battery disconnect systems are disclosed in U.S. Pat. Nos. 3,662,322 and 1,633,176. Other examples of threaded or screw type battery disconnect systems are disclosed in U.S. Pat. Nos. 3,663,927 and 1,375,654. Other such types of prior art battery disconnect systems for facilitating the connection of a battery cable to a battery terminal post are disclosed in U.S. Pat. Nos. 2,892,179; 1,504,919; 2,737,636; 3,646,495; 3,678,439; 3,680,033; 2,622,120; 3,808,579; 2,878,460 and 3,644,871, by way of example. The majority of these prior art systems are directed to specific types of mechanisms for facilitating the rapid connection and disconnection of the battery cable to the existing terminal post and require a special type of terminal post to be utilized. Thus, they are of no benefit in the instance of conventionally available storage batteries. The most prevalent system in use today with respect to automobile storage batteries is a threaded clamp which is normally tightened by means of a transverse screw after the clamp has been fitted over the terminal post. This requires a special tool, i.e. a screwdriver and/or wrench, to loosen the clamp in order to remove the battery cable from the battery terminal post or in order to lock the battery cable to the terminal post. Thus, in the instance of automobile storage batteries, in the absence of such tools, the ordinary driver cannot readily disconnect or connect the battery cables to his automobile storage battery. Furthermore, due to normal corrosion, it often becomes quite difficult to remove the battery cable from the battery terminal post when it is desired to change the battery, for example. These disadvantages of the prior art are overcome by the present invention.

SUMMARY OF THE INVENTION

The present invention is a quick disconnect system for removably connecting an electrical cable to a battery terminal post. The system may preferably be of three types, generally referred to as a spring loaded connector type, a threaded connector type, and a snap-fit connector type. The spring loaded connector type comprises a pair of transverse protrusions extending radially outward from the battery terminal post, a molded hollow socket body having an outer peripheral wall for engaging the posts and a battery cable extending from the socket body and being electrically connectable therethrough to the post when the socket body is mounted on the post. The socket body comprises an opposed pair of angulated slots in the outer peripheral wall for engaging the protrusions when the socket is mounted on the post. The slots are spaced apart in the outer wall for enabling one of the slots to engage each of the protrusions when the socket is removably lockably mounted on the post. Each of the angulated slots has an outer end at the base of the wall in the socket opening to the outside and an interior opening at an inner end at a location removed from the base. Each of the inner end interior openings opens to an interior notch in the socket wall for removably locking the protrusion therein when the socket is removably lockably mounted on the post. Spring means, such as a copper spring which may also serve as an electrical interconnection between the battery cable and the battery terminal post when the socket body is lockably connected to the terminal post, is mounted in the socket body for providing an upward biasing force between the terminal post and the socket body when the socket body is mounted thereon for urging the socket body upwardly away from engagement with the post. The angulated slots are of sufficient extent and configuration to enable the socket body to be lockably connected to the terminal post with the battery cable in electrical connection therewith by slidable engagement of the protrusions in the notches after slidable entry of the protrusions through the slot outer ends and subsequently through the inner ends upon application of a downward reverse biasing force on the socket body sufficient to overcome the spring means upward biasing force until the notches are slidably engaged by the protrusions. The socket body is quickly disconnectable from the terminal post upon application of the downward reverse biasing force to the mounted socket body sufficient to overcome the spring means upward biasing force and therafter slidably disengaging the protrusions from the notches at the inner ends and downwardly from the slots through the outer ends, whereby the battery cable may be quickly connected to and disconnected from the terminal post. The terminal post may be an existing battery terminal post having a transverse aperture provided therethrough with a pin extendable through the aperture to provide the pair of protrusions, whereby an existing battery terminal post may be converted into a system in which the battery cable may be quickly connected to and disconnected from the terminal post.

The threaded quick disconnect system preferably comprises a threaded hollow sleeve member fixedly securable over the terminal post to provide a surrounded terminal post. The surrounded post comprises an electrically conductive exterior portion electrically connected to the existing terminal post, such as the post itself protruding through the sleeve. A molded hollow socket body having interior threads therein complimentary to the threads on the sleeve and lockably threadably engageable therewith for engaging the surrounded post and a battery cable extending from the socket body and being electrically connectable therethrough to the surrounded post when the socket body is mounted on the surrounded post comprise the balance of the system. The socket interior threads and the sleeve threads comprise locking threads for releasably locking the socket to the surrounded post by a 90° rotation of the hollow socket onto the surrounded post in a first direction and quickly disconnecting the socket from the surrounded post by a 90° rotation in a direction opposite to the first direction, whereby an existing battery terminal post may be converted into a system in which the battery cable may be quickly connected to and disconnected from the terminal post.

The snap-fit quick disconnect system comprises a circumferentially extending groove provided in the existing battery terminal post about the longitudinal axis thereof, a snap ring fixedly held in the groove, a molded hollow socket body for engaging the post in a snap-fit engagement, and a battery cable extending from the socket body and being electrically connectable therethrough to the post when the socket body is mounted on the post. The socket body comprises a resilient congruent inner portion snap fittable over the terminal post and the snap ring for releasably locking the socket body to the post. This inner portion comprises an electrically conductive congruent lining or shell electrically connectable between the terminal post and the battery cable when the socket body is snap-fit over the terminal post in lockable engagement therewith, whereby an existing battery terminal post may be converted into a system in which the battery cable may be quickly connected to and disconnected from the terminal post.

BRIEF DESCRIPTION OF DRAWINGS

FIG. 1 is a fragmentary diagrammatic illustration of an existing battery terminal post modified in accordance with the preferred embodiment of the present invention;

FIG. 2 is fragmentary diagrammatic illustration of the preferred connector for use in the embodiment of FIG. 1;

FIG. 3 is a diagrammatic illustration of the connector of FIG. 2 releasably lockably mounted on the battery terminal post of FIG. 1 in accordance with the embodiment of FIG. 1;

FIG. 4 is a fragmentary diagrammatic illustration of another embodiment of a modification to an existing battery terminal post in accordance with the present invention;

FIG. 5 is a diagrammatic illustration, similar to FIG. 4, of an alternative embodiment of the embodiment of FIG. 4;

FIG. 6 is a fragmentary diagrammatic illustration, partly in section, of the embodiment of the preferred connector for use with the embodiment of FIGS. 4 and 5 in accordance with the present invention;

FIG. 7 is a fragmentary diagrammatic illustration, partly in section, of the connector of FIG. 6 mounted on the modified terminal illustrated in FIG. 4 in accordance with the present invention;

FIG. 8 is a fragmentary diagrammatic illustration, partly in section, of still another embodiment of the quick disconnect system of the present invention; and FIG. 9 is a fragmentary sectional view taken along line 9—9 of the embodiment illustrated in FIG. 8.

DETAILED DESCRIPTION OF THE PREFERRED EMBODIMENTS

Referring now to the figures in detail, and intially to FIGS. 1 through 3 thereof, the preferred embodiment of a quick disconnect system for removably connecting an electrical cable to a battery terminal post is shown. The battery cell, such as a conventional storage battery, for example an automobile storage battery, has a fragmentary portion thereof represented by reference numeral 20 labeled "battery" illustratively shown in FIGS. 1 and 3. The representative battery terminal post, such as the anode or cathode associated with the battery 20 is generally represented by the reference numeral 22. This existing battery terminal post 22 is normally a smooth post of the type upon which a U-clamp attached to a battery cable is normally mounted for connecting the conventional battery cable to the terminal post 22 in electrical contact therewith. As shown and preferred in FIG. 1, a transverse pin 24 extends through the existing battery terminal post 22, the pin 24 preferably being inserted through the battery terminal post 22 in a transverse aperture provided therein, such as by drilling. Thus, the pin 24 provides a pair of radially extending protrusions 24a and 24b as a result of the mounting of the pin 24 in the post 22. As shown and preferred in FIG. 2, the preferred battery cable connector arrangement, generally referred to by the reference numeral 26, preferably comprises a molded hollow socket body 28 having an outer peripheral wall 30 for engaging the terminal post 22, as illustrated in FIG. 3, and a conventional battery cable 32 extending from the socket body and being electrically connectable therethrough to the terminal post 22 when the socket body 28 is mounted on the post 22. The battery cable 32, which is preferably conventional, preferably comprises conventional shielding for a conventional conductor, such as a braided copper conductor 34. The socket body 28 preferably includes an opposed pair of angulated slots 36, only one such slot being shown in FIG. 2 with the other angulated slot being directly opposite thereto in the outer peripheral wall 30 on the opposite side thereof. These angulated slots 36, as will be described in greater detail hereinafter, are preferably for engaging the protrusions 24a and 24b respectively when the socket 28 is mounted on the terminal post 22, as illustrated in FIG. 3. Thus, the angulated slots 36 are preferably spaced apart in the outer wall 30 for a sufficient distance for enabling one of the slots 36 to engage each of the protrusions 24a and 24b, respectively, when the socket 28 is removably lockably mounted on the terminal post 22. As shown and preferred in FIGS. 2 and 3, each of the angulated slots 36 has an outer end 36a at the base of the wall 30 in the socket 28 opening to the outside and an interior opening at an inner end 36b at a location removed from the base. Each of the inner end interior openings 36b preferably opens to an interior notch 36c in the socket wall 30 for removably locking the protrusions 24a or 24b therein when the socket 28 is removably lockably mounted on the post 22 as shown in FIG. 3. A coiled spring, such as preferably conductive spring 40 is preferably mounted within the interior of the hollow socket body 28 at the top thereof for providing an upward biasing force between the terminal post 22 and the socket body 28 when the socket body 28 is mounted on the terminal post 22, as shown in FIG. 3, by arrow 42, for urging the socket body 28 upwardly away from engagement with the terminal post 22. The spring 40 is preferably comprised of a conductive material, such as copper and is preferably connected electrically to the copper cable 34 through a conductive copper lining 44 for the interior of the hollow socket body 28. As shown and preferred in FIG. 3, the angulated slots 36 are preferably of sufficient extent and configuration to enable the socket body 28 to be lockably connected to the terminal post 22 with the battery cable 32 in electrical connection therewith by slidable engagement of the protrusion 24a and 24b, respectively, in the notches 36c after slidable entry of the protrusions 24a and 24b, respectively, through the slot outer ends 36a and subsequently along the slot 36 and out through the inner ends 36b into the notches 36c upon application of a downward reverse biasing force on the socket body 28 sufficient to overcome the spring 40 upward biasing force, represented by arrow 42, until the notches 36c are slidably engaged by the respective protrusions 24a and 24b. The socket 28 may be quickly disconnected from the terminal post 22 after being mounted thereon, upon application, once again, of a downward reverse biasing force to the mounted socket 28 in sufficient amount to overcome the spring 40 upward biasing force, represented by arrow 42, and thereafter slidably disengaging the protrusions 24a and 24b from the respective notches 36c at the inner ends 36b and, thereafter, pulling the socket 28 upwardly, the slots 36 thereby travelling upwardly with the pin 24 thus, effectively, moving down the slots through the outer ends 36a so as to enable the socket 28 to be electrically disconnected from the terminal post 22. If desired, socket body 28 may be formed of a conductor such as lead or copper; however, in order to minimize corrosion, the socket body 28 is preferably formed of an electrical insulating material, such as bakelite with the conductive lining being formed within the interior thereof.

Referring now to FIGS. 4 through 7, an alternative embodiment of the quick disconnect system of the present invention is shown. Preferably, as shown and preferred in FIG. 4, a hollow sleeve 50 is fixedly secured over the existing battery terminal post 22. This sleeve 50 may be a conductor or a non-conductor as in the example shown in FIG. 4 since the existing terminal post 22 may have a conductive portion thereof, such as the top of the terminal post 22a, protruding through the sleeve 50 so as to enable an electrically conductive connection between the terminal post 22 and the battery cable 32, as shown in FIG. 3. As shown and preferred in FIGS. 4 and 5, the hollow sleeve 50 or 50a, respectively, surrounds the terminal post 22 with the only difference between sleeve 50 in FIG. 4 and sleeve 50a in FIG. 5 being that sleeve 50a completely covers the existing battery terminal post 22. Thus, in the instance of the embodiment illustrated in FIG. 5, the sleeve 50a preferably comprises an electrical conductor electrically connected to the terminal post 22 or must at least have a portion thereof which provides an electrical interconnection to the terminal post 22. The hollow sleeve 50 or 50a preferably comprises a plurality of threads 52 or 52a, respectively, which are conventional locking threads for releasably locking a socket 56 (FIG. 6), to which the battery cable 32 is electrically connected, to the terminal post 22. As shown and preferred in FIG. 6, the socket body 56 is a molded hollow socket body which is provided with interior threads 58 which are complimentary to the locking threads 52 or 52a contained on the hollow sleeve 50 or 50a, respectively. The interior threads 58 are lockably threadably engageable with locking threads 52 or 52a for engaging the surrounded post 22 to releasably lock the socket body 56 thereon. As was previously mentioned, and as also previously described with respect to the embodiment of FIGS. 1 through 3, a conventional battery cable conductor 34, such as a braided copper conductor, in a conventional shielded battery cable 32 is electrically connectable through the socket body 56 to the surrounded terminal post 22. This is preferably accomplished in the embodiment of FIG. 6 by means of a conductive lining 60 for the interior threads 58, such as a copper lining, which is electrically connected to copper conductor 34. The balance of the socket body preferably comprises an electrical insulator, such as a plastic resin, such as bakelite, such an arrangement reducing corrosion. However, if desired, the entire socket body 56 could be comprised of a conductive material, such as lead or copper. As with the embodiments of FIGS. 1 through 3, the socket body 56 is secured to the battery cable by conventional means, such as screw 64. As shown and preferred in FIG. 7, the socket body 56 is releasably lockably mounted on sleeve 50a, by way of example, by rotating the threaded socket body 56 90° onto the surrounded post 22 in a given direction. Similarly, quick disconnection of the socket body 56 from the surrounded post 22 is accomplished by 90° rotation of the socket body 56 on the surrounded post 22 in a direction opposite to the previous direction. An electrical connection from the surrounded post 22 to the cable 34 is thereby accomplished either through the sleeve 50a to the lining 60 and therefrom to the conductor 34, by way of example (FIG. 4), or through 22a to the lining 60 to the conductor 34, by way of example (FIG. 5).

Referring now to FIGS. 8 and 9, still another alternative embodiment of the quick disconnect system of the present invention is shown. As shown and preferred in FIG. 8, the existing battery terminal post 22 is preferably provided with a circumferentially extending groove 70 therein about the longitudinal axis 72 thereof. A split type snap ring 74 is preferably fixedly held in the groove 70 (FIG. 9). A molded hollow socket body 76 for engaging the terminal post 22 in a snap-fit engagement is preferably provided and is secured to a battery cable 34 extending therefrom in the same fashion as previously described with respect to the embodiment of FIGS. 1 through 7. The socket body 76 preferably comprises a resilient congruent inner portion snap-fittable over the terminal post 22 and the snap ring 74 for releasably locking the socket body 76 to the post 22. As shown and preferred in FIG. 8, the inner portion preferably comprises an electrically conductive congruent lining 80, such as one formed of copper, electrically connectable between the terminal post 22 and the battery cable 34 when the socket body 76 is snap-fit over the terminal post 22 in lockable engagement therewith as illustrated in FIG. 8. The balance of the socket body 82 preferably comprises a resilient plastic, such as bakelite, which comprises an electrical insulator in order to prevent corrosion; however, as mentioned above, if desired, the entire socket body 76 could be comprised of an electrical conductor such as lead or copper. The socket body 76 is preferably quickly connectable and disconnectable to the terminal post 22 due to the resiliency thereof which enables the snap-fit.

Thus, in accordance with the quick disconnect system of the present invention, an existing battery terminal post may readily be converted into a quick disconnect system in which the battery cable may be quickly connected to and disconnected from the terminal post, such readily converted system being either spring loaded as described with reference to FIGS. 1 through 3, threadable as described with reference to FIGS. 4 through 7 or snap-fittable as described with reference to FIGS. 8 and 9.

It is to be understood that the above described embodiments of the invention are merely illustrative of the principles thereof and that numerous modifications in the embodiments of the invention may be derived within the spirit and scope thereof.

What is claimed is:

1. In a disconnect system having a battery cable and an existing unthreaded battery terminal post to which said battery cable is removably connected; the improvement comprising a threaded hollow sleeve member fixedly secured about said existing terminal post to convert said existing unthreaded terminal post into a threaded terminal post, said threaded terminal post having an electrically conductive exterior portion electrically connected to said existing unthreaded terminal post, and a molded hollow socket body having interior threads therein complimentary to the threads on said fixedly secured threaded sleeve and lockably threadably engageable therewith, said hollow socket body being threadably removably mounted on said fixedly secured threaded sleeve with said interior threads engaging said complimentary threads, said socket body further having an electrically conductive interior portion adjacent said interior threads, said battery cable extending from said socket body electrically conductive interior portion and being electrically connected thereto, said electrically conductive interior portion being disposed in electrically conductive contact with said converted threaded terminal post electrically conductive exterior portion and electrically therethrough to said existing unthreaded terminal post when said socket body is threadably mounted on said converted threaded post, said socket body interior threads and said sleeve threads comprising locking threads for releasably locking said socket body to said converted threaded post by a 90° rotation of said hollow socket body onto said fixedly secured threaded sleeve in a first direction and quickly disconnecting said socket body from said fixedly secured threaded sleeve by 90° rotation in a second direction opposite to said first direction, whereby an existing battery terminal post may be converted into a system in which said battery cable may be quickly connected to and disconnected from said existing terminal post. --

2. A quick disconnect system in accordance with claim 1 wherein said electrically conductive exterior portion of said converted threaded terminal post comprises at least a portion of said existing terminal post.

3. A quick disconnect system in accordance with claim 1 wherein the interior of said securable sleeve is substantially congruent to the exterior of said existing terminal post.

4. A quick disconnect system in accordance with claim 1 wherein said secured sleeve comprises an electrically conductive material electrically connected to said existing terminal post.

5. In a disconnect system having a battery cable and an existing battery terminal post to which said battery cable is removably connected; the improvement comprising a circumferentially extending groove provided in said existing battery terminal post about the longitudinal axis thereof, a snap ring fixedly mounted in said provided groove to convert said existing terminal post into a terminal post having a snap ring portion, an electrically conductive portion of said existing battery terminal post being adjacent said snap ring, and a molded hollow socket body fixedly mounted in said converted terminal post comprising a resilient congruent inner portion complimentary to said fixedly mounted snap ring on said converted terminal post and snap fittable thereover for releasably locking said socket body to said fixedly mounted snap ring, said socket body being snap fittably removably mounted on said fixedly mounted snap ring with said complimentary congruent inner portion engaging said snap ring, said congruent inner portion further comprising an electrically conductive congruent interior lining, said battery cable extending from said socket body electrically conductive congruent interior lining and being electrically connected thereto, said electrically conductive congruent interior lining being disposed in electrically conductive contact with said adjacent existing battery terminal post electrically conductive portion when said socket body is snap fittably mounted over said fixedly mounted snap ring in lockable engagememt therewith, whereby an existing battery terminal post may be converted into a system in which said battery cable may be quickly connected to and disconnected from said existing terminal post. --

6. A quick disconnect system in accordance with claim 5 wherein said electrically conductive inner portion comprises copper.

7. A quick disconnect system in accordance with claim 5 wherein said socket body comprises a resilient plastic except for said electrically conductive inner portion.

* * * * *